Figures 1, 2, 3:
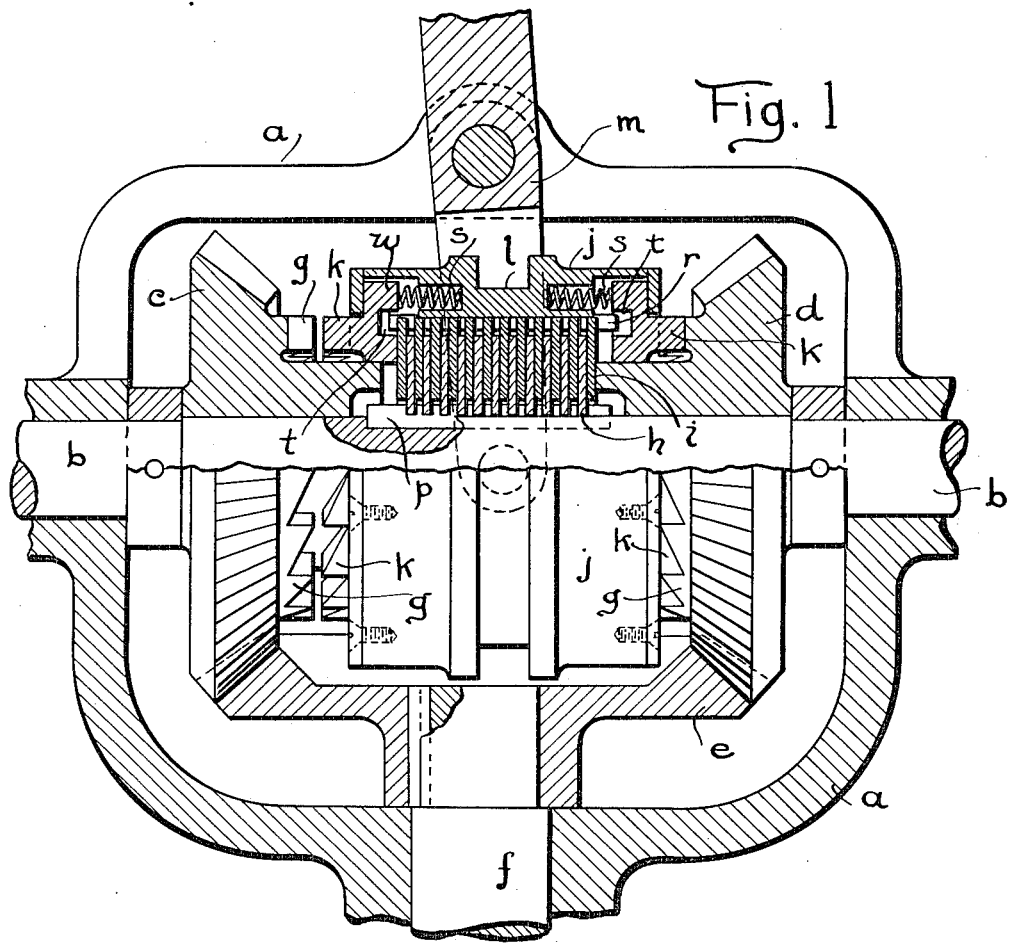

F. E. BAKER.
CLUTCH.
APPLICATION FILED OCT. 15, 1913.

1,120,663.

Patented Dec. 15, 1914.

WITNESSES

INVENTOR
Frank E. Baker
BY
Algernond A. Parker
ATTORNEY

UNITED STATES PATENT OFFICE.

FRANK E. BAKER, OF ROYAL OAK, MICHIGAN, ASSIGNOR TO DETROIT TRACTOR COMPANY, OF LA FAYETTE, INDIANA, A CORPORATION OF INDIANA.

CLUTCH.

1,120,663.   Specification of Letters Patent.   Patented Dec. 15, 1914.

Application filed October 15, 1913. Serial No. 795,202.

*To all whom it may concern:*

Be it known that I, FRANK E. BAKER, a citizen of the United States, residing at Royal Oak, county of Wayne, State of Michigan, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

This invention relates to clutches and has for its object a double-duty clutch, that is, it may be shifted to connect the rotatable member at the right or it may be shifted to connect the rotatable member at the left. It is especially adapted for a steering gear.

In the drawings: Figure 1, is a sectional view of the clutch and a portion of a steering mechanism, some of the parts being shown partly in elevation. Fig. 2, is an elevation on a smaller scale of the clutch. Fig. 3, is a detail of the end of the shifting sleeve, showing the ratchet collar having a sliding connection therewith.

A gear case is indicated at $a$. Through this runs a power shaft $b$, that is ordinarily running when the machine is in operation. This clutch is especially intended for tractors and for use in connection with the steering gear of a tractor. The power shaft $b$ is always running when the tractor is running, for it is connected with a source of power (not shown). A pair of beveled gears $c$ and $d$ are mounted upon the power shaft $b$ to rotate thereupon free of the shaft. Each of these beveled gears $c$ and $d$ meshes with a bevel pinion $e$ upon the steering column $f$. Each beveled gear $c$ and $d$ carries a set of ratchet teeth $g$ and is also provided with a hub protruding beyond the teeth.

A set of clutch disks $h$ are held to the power shaft $b$ by a key $p$ upon which they can slide. A second set of clutch disks $i$ are similarly keyed to the sleeve $j$ by a key $r$. On each end of the sleeve $j$ is a ratchet collar $k$, having teeth that can interlock with the adjacent ratchet teeth of the companion beveled gear. The ratchet collars are slidable longitudinally of the sleeve $j$ and are yieldingly thrust outward by the springs $s$. The collars are recessed at $t$ adjacent the key $r$ so that member may protrude into the recess. The sliding pin $w$ of the collar causes the sleeve and collar to rotate together but allow them to have relative axial movement. The sleeve $j$ has an annular race $l$ into which protrudes the ends of a shifting fork $m$.

In Fig. 1 the sleeve $j$ has been shifted to the right. This brings the ratchet teeth into engagement and thereby rotatably connects the beveled gear $d$ and the sleeve $j$. This connection is effected as soon as the teeth points contact each other, but the sleeve is not connected with the power shaft $b$ until the sleeve is shifted completely to the right so that the set of disks $i$ bear firmly against the set of disks $h$. This packing of the disks is effected by the disks encountering the hub of the bevel gear. When this is accomplished the driving effect will be communicated from the shaft $b$, through the disks $i$ and $h$, the sleeve $j$, the gear $d$ to the pinion $e$ and the steering column $f$ will rotate. Of course the beveled gear $c$ will rotate idly. The shifting of the sleeve $j$ to the left will accomplish the same results with the gear $c$ and then the beveled gear $d$ will rotate idly and the steering column will be rotated in an opposite direction. The ratchet collars and sleeve have relative movement to allow the collar to pack the disks in case that the teeth of the collar do not slip down in between the teeth of the bevel gear. The disks then revolve the ratchet collar and the spring $s$ immediately forces the ratchet teeth into mesh as soon as the teeth have been moved relatively so that their points do not come directly opposite. The spring $s$ is not absolutely essential as other means might be depended upon to cause the teeth to mesh after they have been rotated off the position of the teeth being in point to point contact, as for instance the clutch disks might be capable of opening up automatically and this would force the teeth of the collar into mesh with the teeth of the driven member. In neutral position, the teeth of the ratchet collars $k$ will engage partly with the set of ratchet teeth on each beveled gear and hence the steering column $f$ will be locked against rotation for the beveled gears must always rotate in opposite directions when they rotate together and this they cannot do when the sleeve locks them together. Inasmuch as there is no pressure upon the disks in the neutral, they will rotate without gripping and hence the power from the shaft $b$ is not communicated to either beveled gear.

My invention allows the two sets of disks to do double duty. Of course, separate sets of disks could be used for each beveled gear, but then the gripping surface would be only one-half of what I secure by my invention. Cone clutch heads might be used, but these do not afford gripping surface enough to effectively connect the members where a double headed clutch is used, as will be necessary in shifting the clutch part from one beveled gear to the other. The ratchet teeth not only serve to effect a positive driving connection between the beveled gears and the sleeve $j$, but as already explained, they serve to lock the beveled gears when in neutral position.

What I claim is:

1. The combination of a driving member, a pair of driven members, a set of clutch disks connected with the driving member, a second set of clutch disks, the two sets of clutch disks being slidable to pack the same and bring them into gripping relation with each other, and means for connecting said second set of clutch disks to either driven member.

2. The combination of a driving member, a pair of driven members each provided with a set of teeth, a set of clutch disks connected with the driving member, a second set of clutch disks, a sleeve upon which said second set of clutch disks are supported and provided with teeth at each end attached to said sleeve in non-rotatable relation, whereby the sleeve may be positively connected with either driven member and may bring the second set of clutch disks into gripping relation with the first mentioned set of clutch disks, substantially as described.

3. The combination of a driving member, a pair of driven members, each provided with teeth, a pinion intermeshing with both driven members so as to constantly interlock with these two driven members, a movable sleeve provided with teeth at each end attached to said sleeve in non-rotatable relation, a set of clutch disks connected with the driving member and a second set of clutch disks attached to the sleeve, the said sleeve and the driven members being so spaced that when the sleeve is in central position, the ratchet teeth at both ends of the sleeve will engage with the adjacent ratchet teeth of the driven members, substantially as described.

4. The combination of a driven member provided with teeth on its face, a movable sleeve, a set of disks having a slidable key connection with said sleeve, a driving member passing through said movable sleeve, a set of disks having a sliding key connection with said driving member, a collar provided with teeth that may mesh with teeth on the face of the driven member, the said collar having a sliding key connection with the sleeve, yielding means for projecting the collar with respect to the sleeve, and means on the sleeve for limiting the projection of the collar with respect to the sleeve.

In testimony whereof, I sign this specification in the presence of two witnesses.

FRANK E. BAKER.

Witnesses:
STUART C. BARNES,
MARIETTA E. RUDD.